(12) United States Patent
Donelli et al.

(10) Patent No.: US 8,626,930 B2
(45) Date of Patent: Jan. 7, 2014

(54) MULTIMEDIA CONTENT FILTERING

(75) Inventors: Giovanni Donelli, Calerno (IT); Jerome Bellegarda, Saratoga, CA (US); Steve Ko, San Francisco, CA (US); John Scalo, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 1751 days.

(21) Appl. No.: 11/724,880

(22) Filed: Mar. 15, 2007

(65) Prior Publication Data

US 2008/0228928 A1    Sep. 18, 2008

(51) Int. Cl.
  *H04L 29/06* (2006.01)

(52) U.S. Cl.
  USPC ............................ 709/228; 713/153; 713/154

(58) Field of Classification Search
  USPC .............. 709/224–225, 228–229; 726/23–30; 713/153–154
  See application file for complete search history.

(56) References Cited

U.S. PATENT DOCUMENTS

| | | | |
|---|---|---|---|
| 5,924,105 A * | 7/1999 | Punch et al. ................... | 715/234 |
| 6,041,360 A | 3/2000 | Himmel et al. | |
| 6,295,559 B1 * | 9/2001 | Emens et al. ................. | 709/225 |
| 6,366,947 B1 * | 4/2002 | Kavner ......................... | 709/203 |
| 6,374,217 B1 | 4/2002 | Bellegarda | |
| 7,076,527 B2 | 7/2006 | Bellegarda et al. | |
| 7,124,081 B1 | 10/2006 | Bellegarda | |
| 7,149,695 B1 | 12/2006 | Bellegarda | |
| 7,194,464 B2 * | 3/2007 | Kester et al. .......................... | 1/1 |
| 7,343,559 B1 | 3/2008 | Fujita et al. | |
| 2002/0010757 A1 * | 1/2002 | Granik et al. ................ | 709/218 |
| 2002/0016786 A1 | 2/2002 | Pitkow et al. | |
| 2002/0103789 A1 | 8/2002 | Turnbull et al. | |
| 2002/0152237 A1 | 10/2002 | Cohen et al. | |
| 2002/1911020 | 12/2002 | Kaply et al. | |
| 2003/0009526 A1 * | 1/2003 | Bellegarda et al. ........... | 709/206 |
| 2003/0090510 A1 | 5/2003 | Shuping et al. | |
| 2005/0060404 A1 * | 3/2005 | Ahlander et al. ............. | 709/224 |
| 2005/0132018 A1 | 6/2005 | Milic-Frayling et al. | |
| 2005/0179076 A1 | 8/2005 | Lin et al. | |
| 2006/0004716 A1 * | 1/2006 | Hurst-Hiller et al. ............. | 707/3 |
| 2006/0020714 A1 * | 1/2006 | Girouard et al. .............. | 709/246 |
| 2006/0101330 A1 | 5/2006 | Godley | |

(Continued)

OTHER PUBLICATIONS

"Customizing your computer—To display hidden files and folders" Windows XP Professional Product Documentation Dec. 30, 2007, XP002561535 (1 pg.).

(Continued)

*Primary Examiner* — Eleni Shiferaw
*Assistant Examiner* — Phy Anh Vu
(74) *Attorney, Agent, or Firm* — Kenyon & Kenyon, LLP

(57) ABSTRACT

Methods and apparatuses to filter multimedia content are described. The multimedia content in one embodiment is analyzed for one or more parameters. The multimedia content in one embodiment is filtered based on the one or more parameters using a latent semantic mapping ("LSM") filter. In one embodiment, the one or more parameters include information about a structure of the multimedia content. A tag that encapsulates the one or more parameters may be generated. Then, the tag is input into the latent semantic mapping filter. In one embodiment, the LSM filter is trained to recognize the multimedia content based on the one or more parameters. In one embodiment, more than two categories are provided for a multimedia content. The multimedia content is classified in more than two categories using the LSM filter. The multimedia content may be blocked based on the classifying.

53 Claims, 13 Drawing Sheets

(56) References Cited

U.S. PATENT DOCUMENTS

| | | | |
|---|---|---|---|
| 2006/0224997 | A1 | 10/2006 | Wong et al. |
| 2006/0265417 | A1 | 11/2006 | Amato et al. |
| 2007/0011616 | A1 | 1/2007 | Ording |
| 2007/0174389 | A1 | 7/2007 | Armstrong et al. |
| 2008/0046840 | A1 | 2/2008 | Melton et al. |

OTHER PUBLICATIONS

"Find and Return to Web Pages You've Recently Visited" microsoft.com Aug. 23, 2006, XP002561531. Retrieved from the Internet: URL:http://www.microsoft.com/windows/ie/ie6/using/howto/basics/history/button.mspx> (3 pgs.).

Anonymous: "Awasu—Features" Internet citation Jan. 3, 2007, XP002561537. Retrieved from the Internet: URL:http://web.archive.org/web/20070103184812/www.awasu.com/features.php> (3 pgs.).

EP Search Report for EP Application No. 09173177.8, mailed Jan. 28, 2010, (16 pgs.).

Glenn Derene: "How Google's Simple Chrome Could Steer Web's Complex Future: Analysis" popularmechanics.com Sep. 2, 2008, XP002561529 Retrieved from the Internet: URL:http://www.popularmechanics.com/technology/industry/4280717.html> (3 pgs.).

Jason Hiner: "Google Chrome: The five best new features" blogs.zdnet.com Sep. 3, 2008, XP002561528. Retrieved from the Internet: URL:http://blogs.zdnet.com/BTL/?p=9878> (3 pgs.).

Josh Lowensohn: "FoxTab turns your browser tabs into a spectacle" cnet news Sep. 17, 2008, XP002561530. Retrieved from the Internet: URL:http://news.cnet.com/8301-17939_109-10044366-2.html> (2 pgs.).

Kaasten S et al: "Designing an Integrated Bookmark/History System for Web Browsing" Mar. 1, 2000, Proceedings Western Computer Graphics Symposium, XX, XX, pp. 1-04 , XP008031090 p. 2, paragraph 2.2—p. 3, paragraph 3.4; figure 1 (4 pgs).

PCT Notification of Transmittal of the International Search Report and the Written Opinion of the International Searching Authority, or the Declaration for PCT/US09/60391, mailed Dec. 7, 2009, (3 pgs.).

Tommy A. Olsen: "Speed dial tips" my.opera.com Mar. 1, 2007, XP002561536. Retrieved from the Internet: URL:http://my.opera.com/toman/blog/show.dml/788600> (4 pgs.).

"FoxTab Tab Switching Firefox Add-on" http://www.youtube.com/watch?v=JJhvGqj5yNM, Oct. 7, 2008, 2 pages, retrieved from the Internet on Jan. 25, 2011.

* cited by examiner

MULTIMEDIA CONTENT FILTERING

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright ©2006, Apple Inc., All Rights Reserved.

FIELD

Embodiments of the invention relate to content filtering, and more particularly, to multimedia content filtering using latent semantic analysis.

BACKGROUND

The use of computer systems and the Internet for communication and obtaining information has grown drastically over the years. The Internet may be described as a collection of interconnected computer networks. The World Wide Web ("Web") may be described as a collection of interconnected documents and other resources, linked by hyperlinks and Uniform Resource Locators ("URLs"). The Web may be accessed using a computer via the Internet, and are many other services available through the Web including e-mail, file sharing, and others. Through the Internet, millions of people worldwide have easy, virtually instant access to a vast and diverse amount of on-line information. Compared to encyclopedias and traditional libraries, the World Wide Web has enabled a sudden and extreme decentralization of information and data. The Web is a fast changing place, as web sites may change and new ones may come up all the time.

A content-control software, for example, Cyber Patrol™, squidGuard™, NetNanny™, NetBarrier™, ContentBarrier™, DansGuardian™ may be used to control and restrict material delivered over the Web to a user. Typical users of such software includes parents who wish to limit what web sites their children may view from home computers, schools performing the same function with regard to computers found at school, employers restricting what content may be viewed by employees while on the job, and the like.

Most existing content controls typically filter the access to web pages based on a list of banned sites. Some filters allow control of advertisements through features like blacklists, whitelists, and regular expression filters. Some web browsers include content filtering, which prevents certain external files from the blacklist from loading.

Typically, the existing content-controlling filters operate at a proxy server. These programs work by caching and filtering content before it is displayed in a user's browser. DansGuardian™, an Open Source proxy software, in addition to a list of banned sites, has a static list of weighted phrases and words. DansGuardian™ may filter the web pages based on phrase matching and URL matching. DansGuardian™, however, ignores a new word that is not in the static list.

The proxy content controlling filters, however, may not control all web traffic going through the system.

Additionally, to adapt to the changes that happen on the Web, the existing content controlling filters solutions typically use neutral networks and baysian statistics methodologies.

SUMMARY OF THE DESCRIPTION

Methods and apparatuses to filter multimedia content, e.g., web sites, are described. The multimedia content, in one embodiment, is analyzed for one or more parameters. The multimedia content is determined to be filtered based on the one or more parameters using a latent semantic mapping ("LSM") filter. The one or more parameters may include information about a structure of the multimedia content. The structure of the multimedia content may include references (e.g., hyperlinks to other web pages), images (e.g., the number of images on a web page), textual and pictorial patterns, a size of the content, and the like. A tag that encapsulates the one or more parameters may be generated. The tag may then be provided to the LSM filter. In one embodiment, the LSM filter is trained to recognize the multimedia content based on the one or more parameters. In one embodiment, rating of the multimedia content is performed based on the one or more parameters.

In one embodiment, more than two categories are provided for a multimedia content. The multimedia content is classified in the more than two categories using the LSM filter. The more than two categories may be any combination of an explicit content category and a plurality of legitimate content categories; a legitimate content category and a plurality of explicit content categories; or a plurality of explicit content categories and a plurality of legitimate content categories. The multimedia content may be blocked based on the classifying. A reference to the multimedia content may be stored. In one embodiment, an LSM filter is trained to recognize the multimedia content among more than two categories.

In one embodiment, a blocked multimedia content is accepted to be unblocked in response to receiving an input from a user. In one embodiment, the unblocked multimedia content is added to a "white" list and/or may be used to train the LSM filter. Further, an unblocked multimedia content may be indicated to be in a first class or category (e.g., porn category), and to be added to a list and/or may be used to train an LSM filter.

In one embodiment, a multimedia content is converted or processed into a plain text. In one embodiment, the multimedia content, e.g., a web page is converted into the plain text using an HTML stripper. In one embodiment, strings within a Javascript or other executable scripts are extracted to convert the multimedia content into the plain text or into another format. The multimedia content is analyzed for one or more parameters. A tag may be generated that encapsulates the one or more parameters. In one embodiment, the tag includes a string of characters. Further, the tag is inserted into (or otherwise associated with) the plain text and both, as tokens, become input for the LSM filter. The LSM filter has a vector space. Tokens may be mapped into a vector space of the LSM filter. In one embodiment, one or more stop words may be removed from the plain text; this may be done to protect against false positives. A false positive may include, for example, a legitimate material that is wrongly classified as an objectionable material. Filtering of the multimedia content may be performed based on the mapping of the tokens in the vector space.

BRIEF DESCRIPTION OF THE DRAWINGS

The present invention is illustrated by way of example and not limitation in the figures of the accompanying drawings in which like references indicate similar elements.

DETAILED DESCRIPTION

The subject invention will be described with references to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

Reference throughout the specification to "one embodiment", "another embodiment", or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Methods and apparatuses to filter multimedia content based on one or more parameters using a latent semantic mapping filter and a system having a computer readable medium containing executable program code to filter multimedia content based on one or more parameters using a latent semantic mapping ("LSM") filter are described below.

Other methods and other features are also described.

Generally, the term "multimedia" is referred to a media that uses multiple forms of information content and information processing (e.g., text, audio, graphics, animation, video, interactivity) to inform or entertain the (user) audience. The term "multimedia" also may refer to the use of (but not limited to) electronic media to store and experience multimedia content. On-line multimedia may be downloaded or streamed. Streaming multimedia may be live or on-demand. Multimedia content includes hypermedia content. The term "hypermedia" is referred to a combination of graphics, audio, video, text, and hyperlinks and generally offers a user interactivity to control progress of the content. World Wide Web is an example of hypermedia. Most of hypermedia content is typically delivered via electronic pages.

Figure 1A:
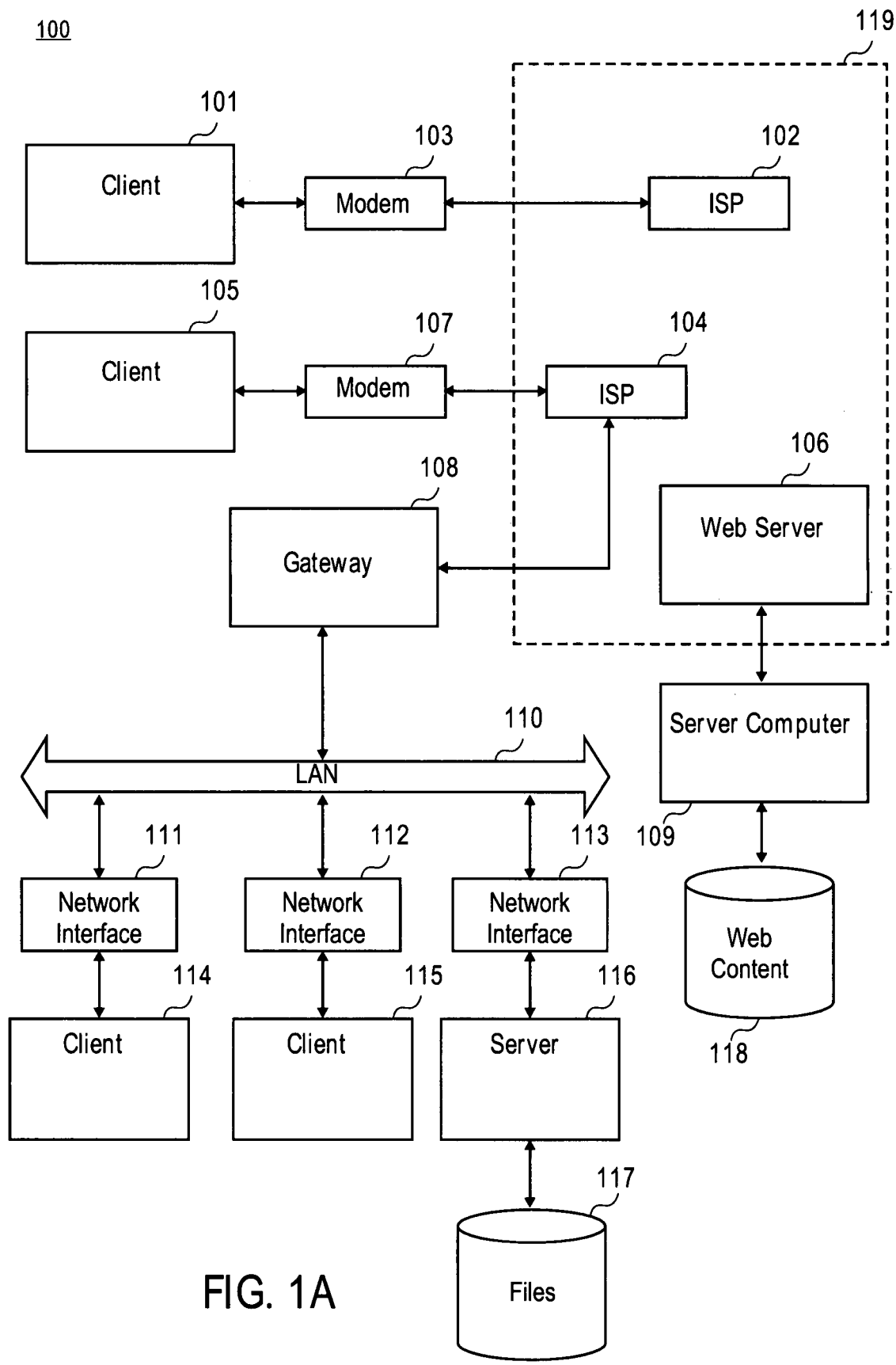
FIG. 1A illustrates an example of a plurality of systems in a network.

FIG. 1A illustrates one embodiment of a system 100 to perform multimedia content filtering as described in further detail below with respect to FIGS. 2-11. System 100 includes client computer systems coupled together through a network 119, e.g. the Internet, as shown in FIG. 1A. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 119 is typically provided by Internet service providers (ISP), e.g., the ISPs 102 and 104. Users on client systems, such as client computer systems 101, 105, 114, and 115 may obtain access to the Internet through the Internet service providers, such as ISPs 102 and 104. Access to the Internet allows users of the client computer systems to exchange information receive and send e-mails, and view documents, for example, documents which have been prepared in the HTML format. This information is often provided by web servers, such as web server 106, which is considered to be "on" the Internet. Often these web servers are provided by the ISPs, such as ISP 102, although a computer system can be set up and connected to the Internet without that system being also an ISP as is well known in the art.

The web server 106 is typically at least one computer system which operates as a server computer system and is configured to operate with the protocols of the World Wide Web and is coupled to the Internet. Optionally, the web server 106 can be part of an ISP which provides access to the Internet for client systems. The web server 106 is shown coupled to the server computer system 109 which itself is coupled to web content 118, which can be considered a form of a multimedia database. It will be appreciated that while two computer systems 106 and 109 are shown in FIG. 1A, the web server system 106 and the server computer system 109 can be one computer system having different software components providing the web server functionality and the server functionality provided by the server computer system 109. It will be appreciated that multiple web servers, which serve multiple webpages, may be coupled to network 119.

Client computer systems 101, 105, 114, and 115 can each, with the appropriate web browsing software, view HTML pages provided by the web server 106. The ISP 102 provides Internet connectivity to the client computer system 101 through a modem 103 which can be considered part of the client computer system 102. The client computer system can be a personal computer system, a network computer, a Web TV system, a handheld device, other such computer system, or other consumer electronic device. Similarly, the ISP 104 provides Internet connectivity for client systems 105, 114, and 115, although as shown in FIG. 1A. Client computer system 105 is coupled through a modem interface 107 while client computer systems 115 and 114 are part of a LAN. While FIG. 1A shows the interfaces 103 and 107 as generically as a "modem," it will be appreciated that each of these interfaces can be an analog modem, ISDN modem, cable modem, satellite transmission interface, or other interfaces for coupling a computer system to other computer systems. Client computer systems 114 and 115 are coupled to a Local Area Network (LAN) 110 through network interfaces 111 and 112, which can be Ethernet network or other network interfaces. The LAN 110 is also coupled to a gateway computer system 108 which can provide firewall and other Internet related services for the local area network. This gateway computer system 108 is coupled to the ISP 104 to provide Internet connectivity to the client computer systems 114 and 115. The gateway computer system 108 can be a conventional server computer system. Also, the web server system 106 can be a conventional server computer system.

Alternatively, a server computer system 116 can be directly coupled to the LAN 110 through a network interface 113 to provide files 117 and other services to the clients 114, 115, without the need to connect to the Internet through the gateway system 110. Furthermore, any combination of client systems 101, 105, 114, 115 may be connected together in a peer-to-peer network using LAN 110, Internet 119 or a combination as a communications medium. Generally, a peer-to-peer network distributes data across a network of multiple machines for storage and retrieval without the use of a central server or servers. Thus, each peer network node may incorporate the functions of both the client and the server described above.

Figure 1B:
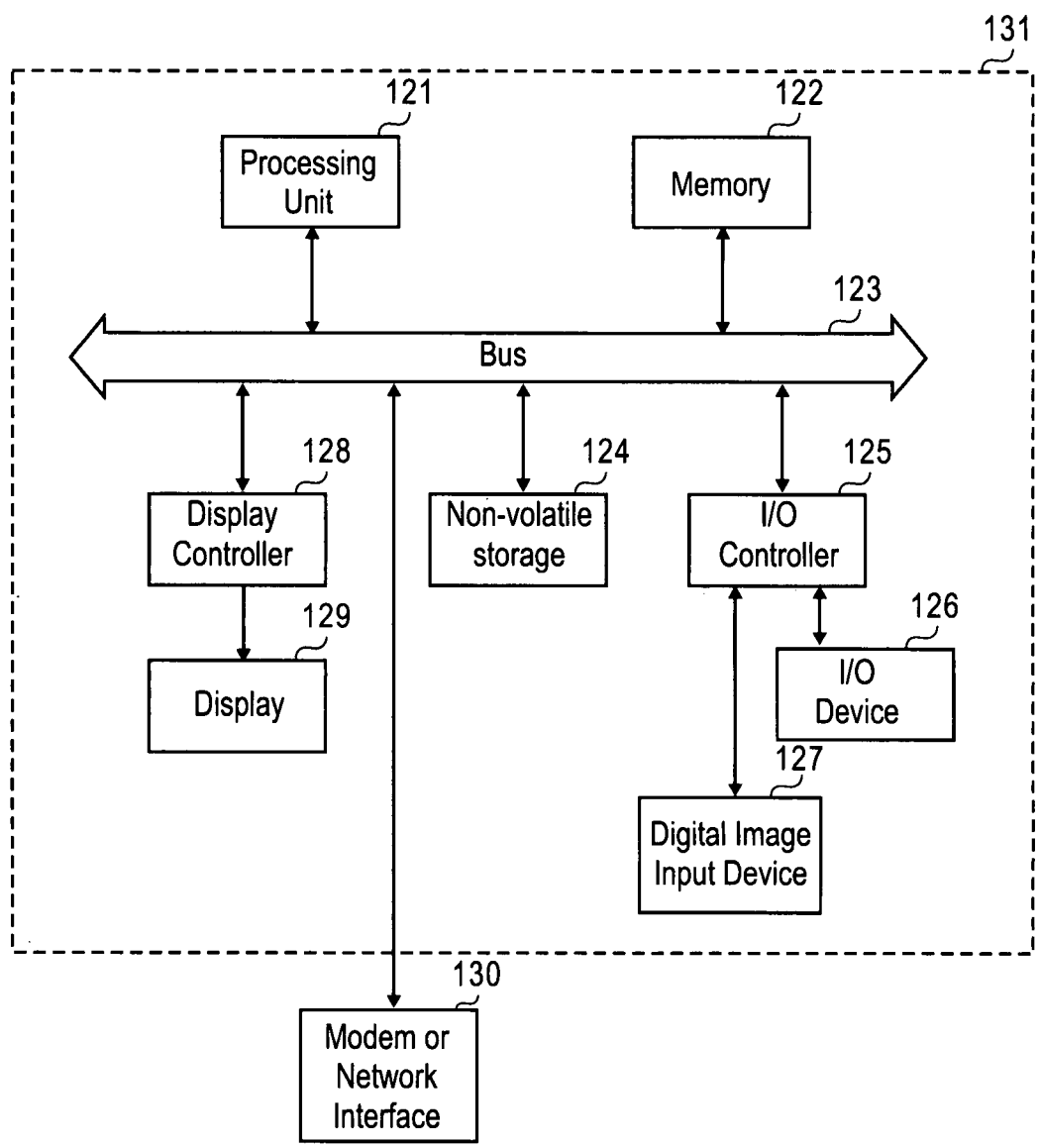
FIG. 1B illustrates one embodiment of a system to perform multimedia content filtering.

FIG. 1B shows one embodiment of a computer system that can be used as a client computer system or a server computer system or as a web server system to perform multimedia content filtering, as described below with respect to FIGS. 2-11. It will also be appreciated that such a computer system can be used to perform many of the functions of an Internet service provider, such as ISP 102 depicted in FIG. 1A. A computer system 131 interfaces to external systems through the modem or network interface 130. It will be appreciated that the modem or network interface 130 can be considered to be part of the computer system 131. This interface 130 can be an analog modem, ISDN modem, cable modem, token ring interface, satellite transmission interface, or other interfaces for coupling a computer system to other computer systems.

Computer system 131 includes a processing unit 121 that may include a microprocessor, such as an Intel Pentium® microprocessor, Motorola Power PC® microprocessor, Intel Core™ Duo processor, AMD Athlon™ processor, AMD Turion™ processor, AMD Sempron™ processor, and any other microprocessor. Processing unit 121 may include a personal computer (PC), such as a Macintosh® (from Apple Inc. of Cupertino, Calif.), Windows®-based PC (from Microsoft Corporation of Redmond, Wash.), or one of a wide variety of hardware platforms that run the UNIX operating system or other operating systems. For one embodiment, processing unit 121 includes a general purpose computer system based on the PowerPC®, Intel Core™ Duo, AMD Athlon™, AMD Turion™ processor, AMD Sempron™, HP Pavilion™ PC, HP Compaq™ PC, and any other processor families. Processing unit 121 may be a conventional microprocessor such as an Intel Pentium microprocessor or Motorola Power PC microprocessor.

As shown in FIG. 1B, memory 122 is coupled to the processing unit 121 by a bus 123. Memory 122 can be dynamic random access memory (DRAM) and can also include static random access memory (SRAM). A bus 123 couples processing unit 121 to the memory 122 and also to non-volatile storage 124 and to display controller 128 and to the input/output (I/O) controller 125. Display controller 128 controls in the conventional manner a display on a display device 129 which can be a cathode ray tube (CRT) or liquid crystal display (LCD). The input/output devices 126 can include a keyboard, disk drives, printers, a scanner, and other input and output devices, including a mouse or other pointing device. The display controller 128 and the I/O controller 125 can be implemented with conventional well known technology. A digital image input device 127, for example, a digital camera may be coupled to an I/O controller 125 input images into the computer system 131. The non-volatile storage 124 is often a magnetic hard disk, an optical disk, or another form of storage for large amounts of data. Some of this data is often written, by a direct memory access process, into memory 122 during execution of software in the computer system 131. One of skill in the art will immediately recognize that the terms "computer-readable medium" and "machine-readable medium" include any type of storage device that is accessible by the processing unit 121.

It will be appreciated that computer system 131 is one example of many possible computer systems which have different architectures. For example, personal computers based on an Intel microprocessor often have multiple buses, one of which can be an input/output (I/O) bus for the peripherals and one that directly connects the processing unit 121 and the memory 122 (often referred to as a memory bus). The buses are connected together through bridge components that perform any necessary translation due to differing bus protocols.

Network computers are another type of computer system that can be used with the embodiments of the present invention. Network computers do not usually include a hard disk or other mass storage, and the executable programs are loaded from a network connection into the memory 122 for execution by the processing unit 121. A Web TV system, which is known in the art, is also considered to be a computer system according to the embodiments of the present invention, but it may lack some of the features shown in FIG. 1B, such as certain input or output devices. A typical computer system will usually include at least a processor, memory, and a bus coupling the memory to the processor.

It will also be appreciated that the computer system 131 is controlled by operating system software which includes a file management system, such as a disk operating system, which is part of the operating system software. One example of an operating system software is the family of operating systems known as Macintosh® Operating System (Mac OS®) or Mac OS X® from Apple Inc. of Cupertino, Calif. Another example of an operating system software is the family of operating systems known as Windows® from Microsoft Corporation of Redmond, Wash., and their associated file management systems. The file management system is typically stored in the non-volatile storage 124 and causes the processing unit 121 to execute the various acts required by the operating system to input and output data and to store data in memory, including storing files on the non-volatile storage 124.

Figure 2A:
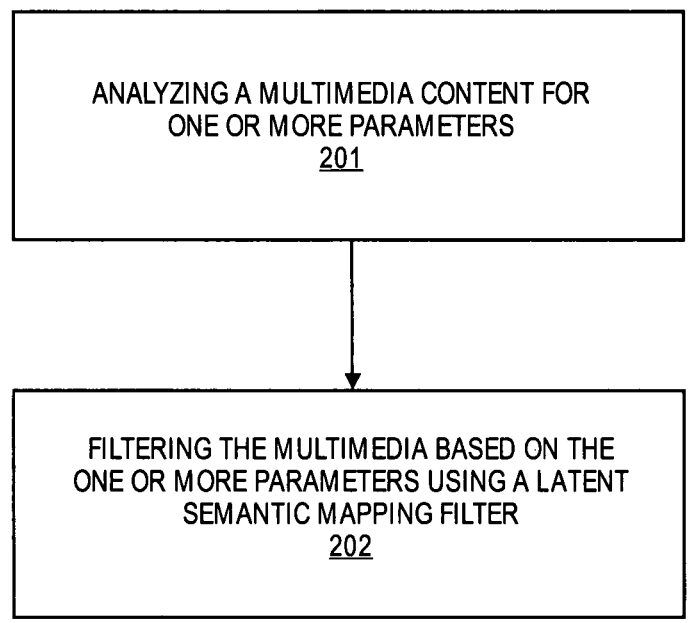
FIG. 2A shows a flowchart of one embodiment of a method to perform multimedia content filtering using an LSM filter.

FIG. 2A shows a flowchart of one embodiment of a method to perform multimedia content filtering. The multimedia content may be classified and filtered using latent semantic mapping ("LSM"). The multimedia content may be, for example, a web page, a document, audio messages, emails, computer programs (e.g., computer viruses), text, and any other multimedia content, as described above. In one embodiment, the latent semantic mapping takes a multimedia content, for example, a web page, and/or a document, and maps that multimedia content into a space that describes relationships between multimedia contents based on data, e.g., words and/or other data ("one or more parameters"), that correlate with each other in the document. That is, the topic of the multimedia content is driven by relationships between the data representing the multimedia content. To perform the LSM, a training corpus that includes data, e.g., words, paragraphs, sentences, documents, and/or one or more parameters representing legitimate and non-legitimate ("explicit") multimedia contents may be formed. In one embodiment, legitimate and explicit multimedia contents may be obtained, for example, from legitimate and explicit web sites. In another embodiment, the legitimate and explicit multimedia contents may be determined by a user. In one embodiment, co-occurrences of the data representing the legitimate and explicit multimedia contents may be determined based on the training corpus. For example, the number of times each word, and/or other data appears in each legitimate and each explicit multimedia content may be recorded to determine the co-occurrences. By leveraging these co-occurrences the multimedia contents may be mapped into corresponding vectors in a continuous vector space. The vectors may characterize the position of the data representing the multimedia contents in this vector space. In one embodiment, the data representing multimedia contents are mapped into corresponding vectors using a Singular Value Decomposition ("SVD") technique. The latent semantic mapping using the SVD technique is described in U.S. patent application Ser. No. 09/267,334, which has been issued as U.S. Pat. No. 6,374,217 on Apr. 16, 2002; U.S. patent application Ser. No. 09/967,072, which has been issued as U.S. Pat. No. 7,124,081 on Oct. 17, 2006; U.S. patent application Ser. No. 09/881,986, which has been issued as U.S. Pat. No. 7,076,527 on Jul. 11, 2006; and U.S. patent application Ser. No. 09/688,010, which has been issued as U.S. Pat. No. 7,149,695 on Dec. 12, 2006, which are incorporated here in their entirety by reference.

As shown in FIG. 2A, a method 200 begins with operation 201 that involves analyzing a multimedia content for one or more parameters. The multimedia content, e.g., a web page, an audio, a video, and any other multimedia content, is analyzed for certain characteristics to determine one or more parameters. The multimedia content may be analyzed for images, visible/non-visible texts, textual and image patterns, references (e.g., links), video, audio, and the like. The one or more parameters may include information about a structure of the multimedia content. The information about the structure of the multimedia content may include information about the size, an amount, and names of images, references, visible text, non-visible text, audio and video in the content. In one embodiment, the multimedia content, e.g., a web page, and any other multimedia content, is analyzed to determine a number of images in the multimedia content. In one embodiment, the multimedia content, e.g. a web page, is analyzed to determine, for example, a number of references (e.g., hypertext links to other web pages or URLs) in the multimedia content. Typically, explicit websites link to a lot of other websites. The multimedia content can be analyzed to determine a number of external links, a number of internal links, a number of broken links in the content. In one embodiment, the multimedia content is analyzed to determine the size of an image, for example, by looking for a total number of image pixels and/or megapixels which are displayed on a web page. An image may include several megapixels. In one embodiment, for example, when the image is resized, only a portion of the megapixels may be shown on the screen. The multimedia content can be analyzed for other characteristics, for example, a relative size of a portion of a screen or web page that is covered by images; names of images; presence of image tags that when the page is composed, provides alternate image to display. For example, a web page may have over 60% of its visible content made up of images, a characteristic that is common to a lot of pornography pages. On the other hand, if an image is a logo, it may occupy only a small portion of the web page. In one embodiment, the multimedia content may be analyzed to determine whether a non-visible text is present. In one embodiment, the multimedia content is analyzed to determine a length of the content. For example, the number of words in a document is determined. In one embodiment, the one or more parameters include a text-to-image ratio. In one embodiment, the one or more parameters include a ratio between the document length and image pixels. In one embodiment, the multimedia content is analyzed to determine the presence of one or more certain textual patterns, for example, "USC section 2257" or any of its substrings. This textual pattern typically refers to a law code regarding an explicit material, such as adult web sites. In one embodiment, the textual pattern may be a number, e.g., 18. Number 18 may be often used on adult websites to indicate that all models are over age of 18. In another embodiment, the multimedia content is analyzed to take into account the text or other information that is the same color as the background that may be embedded into web pages.

Next, operation 202 is performed that involves filtering the multimedia content based on the one or more parameters using a latent semantic mapping ("LSM") filter. In one embodiment, the multimedia content is mapped into a vector space by the LSM filter based on one or more parameters, as described below. In one embodiment, the multimedia content is rated based on the one or more parameters, as described in further detail below.

Figure 2B:
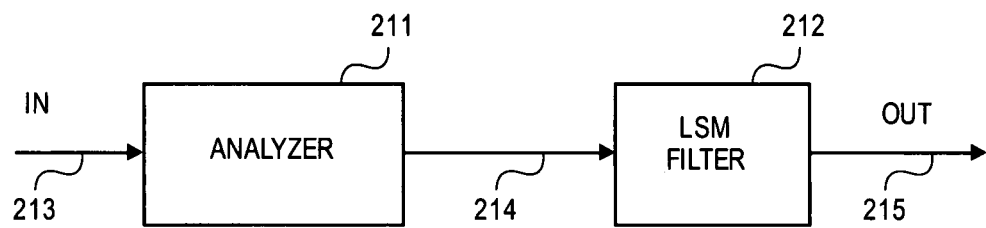
FIG. 2B shows a block-diagram of one embodiment of an apparatus to perform multimedia content filtering using an LSM filter.

FIG. 2B shows a block-diagram of one embodiment of an apparatus 210 to perform multimedia content filtering. Apparatus 210 is a multimedia content filter that takes as an input a multimedia content and returns whether the multimedia content contains explicit material or not. As shown in FIG. 2B, apparatus 210 includes an analyzer 211 and LSM filter 212. Input of the analyzer 211 receives a multimedia content 213, e.g., an HTML web page, audio, video, and any other multimedia content. Analyzer 211 analyzes content 213 for certain characteristics to determine one or more parameters, as described above. Analyzer 211 outputs the multimedia content with the one or more parameters 214 into an LSM filter 212. That is, analyzer 211 provides the multimedia content with the one or more parameters that include the information captured from and analyzed in regard to this multimedia content as an input 214 to LSM filter 212.

In one embodiment, the one or more parameters extracted from the multimedia content, e.g., a web page, audio, video, and any other multimedia content, are encapsulated as a tag. For example, if a web page has 10 images, a tag may be turned on that indicates that more than a predetermined amount of images (e.g., five) are in that page. In one embodiment the tag that encapsulates the one or more parameters is a string of characters. In one embodiment, the tag is a string of characters that is considered by LSM filter 212 as one or more words. The textual nature of the tags makes them amenable to LSM processing no matter what original multimedia content they characterize. As such, the multimedia content characterized by the tags may be a web page, an audio, a video, and any other multimedia content. The tag is inserted into the multimedia content 213 to provide an input 214 into LSM filter 212. LSM filter 212 is first trained to recognize a specific set of multimedia contents based on the one or more parameters and then the data collected in the training phase is used to determine the legitimacy of new multimedia contents. Training of LSM filter 212 includes automatically reconfiguring the filter 212 based on the observed set of multimedia contents (data) that include one or more parameters. By inserting the tags into the multimedia content that is fed into LSM filter 212, the LSM filter 212 is trained to recognize the multimedia content based on word contents and additional characteristics of the multimedia content. The additional characteristics of the multimedia contents include for example, a structure of the multimedia content, e.g., specific structural patterns of explicit and legitimate multimedia contents. The LSM filter can be trained by being fed with a plurality of multimedia contents including legitimate and non-legitimate ("explicit") contents, as described in further detail below and a human can indicate whether the content is one type or the other type in order to train the filter.

LSM filter 212 filters multimedia content 213 based on the one or more parameters encapsulated into the tag. In one embodiment, filter 212 uses the tag as a factor in determining a rating of the multimedia content 213. In one embodiment, the tags of input 214 can be weighted to have greater or lesser importance. For example, the textual pattern "USC section 2257" does not necessarily mean that the content is explicit, but the tag that encapsulates the information about this textual pattern is weighted so that the content receives a certain score towards material that is explicit. In one embodiment, the title of the web page may be weighted more than once, if the title appears in the text representation of the webpage two or three times in comparison with the size of the page. In one embodiment, an API core in LSM filter 212 allows to weigh a particular word more than once. As shown in FIG. 2B, filter 212 outputs a filtered multimedia content 215, as shown in FIG. 2B. In one embodiment, LSM filter 212 is trained to recognize the multimedia content based on the one or more parameters.

In one embodiment apparatus 210 is a socket filter, which operates at a kernel level, so it affects all web traffic that goes through a data processing system. In another embodiment, apparatus 210 is a proxy filter that operates at a proxy server of a data processing system. In yet another embodiment, apparatus 210 operates at a proxy server and at a kernel level.

Figure 3:
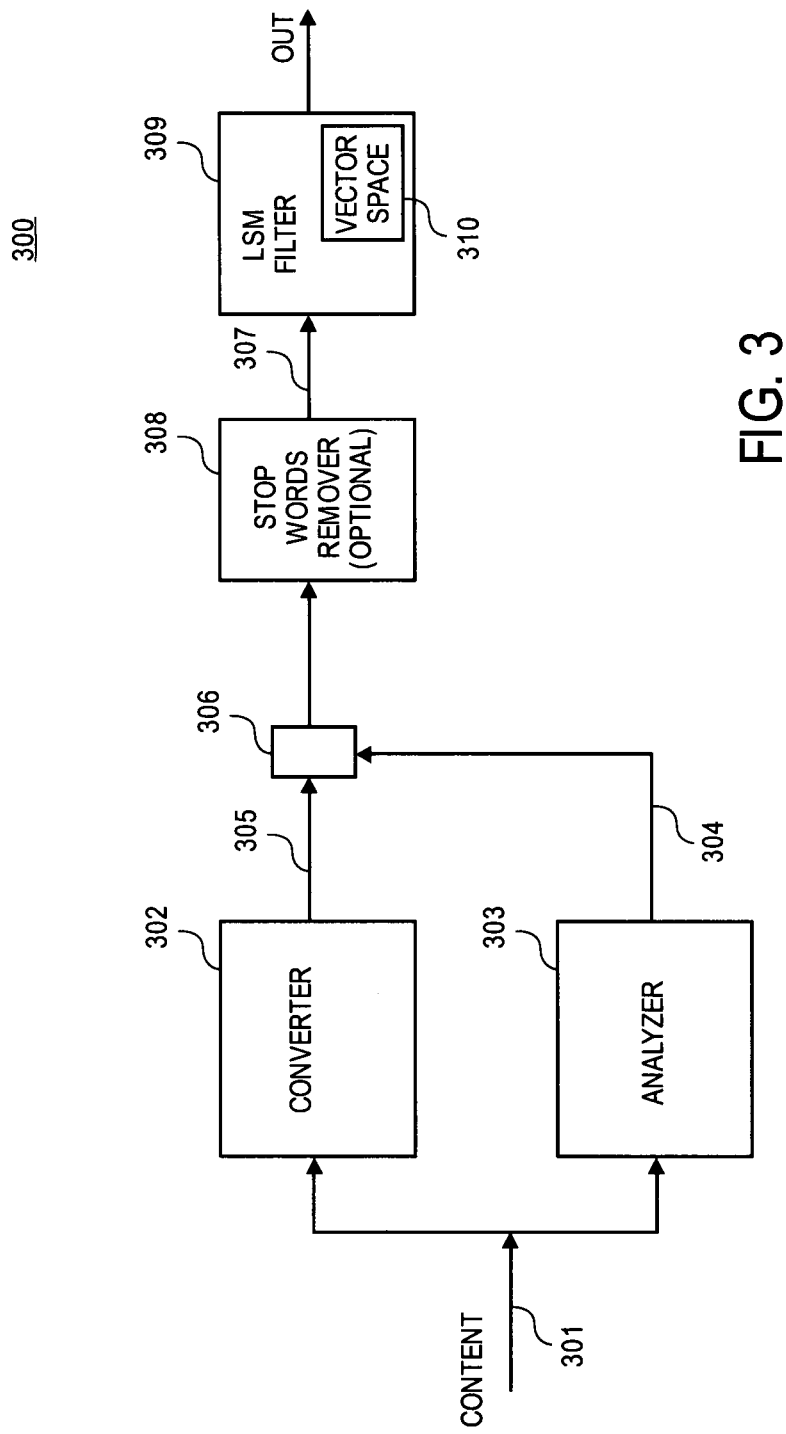
FIG. 3 shows a block-diagram of one embodiment of an apparatus to perform multimedia content filtering based on one or more parameters using an LSM filter.

FIG. 3 shows a block-diagram of one embodiment of an apparatus to perform multimedia content filtering. As shown in FIG. 3, multimedia content 301, e.g., an HTML web page, is received by analyzer 303 and converter 302. Converter 302 is used to convert or otherwise preprocess multimedia content 301, e.g, an HTML web page, into a plain text (words) 305 to obtain significant content out of the multimedia content (e.g., from HTML). For example, all of the typesetting of the web page may be disregarded. In one embodiment, converter 302 is an HTML stripper which removes HTML code relating to formatting, etc. to extract plain text which is displayed, etc. on the web page. The HTML stripper checks for every tag of the HTML document and retains information that it considers relevant. For example, the HTML stripper may retain the title of the web page, meta tags that include meta information added to the HTML that is usually used by search engines or the Internet, or tools to categorize the page. Such information is useful for the content filter. Because some web pages may be Javascript® generated, e.g., Google® images, the Javascript® strings, for example, text contained in between quotation marks " ", are retained. In one embodiment, retaining the Javascript® strings is disabled when an LSM filter is trained, to prevent random strings from being part of the training data which may add noise to the filter evaluation. In one embodiment, the retained Javascript strings are used to add weight to a new multimedia content. Further, all the information regarding the images in the multimedia content is collected, e.g., size and the number of images. Further, the information regarding the number of links is collected.

During the conversion, the content 301 is analyzed for certain characteristics to determine one or more parameters associated with the overall structure of the multimedia content.

As shown in FIG. 3, analyzer 303 is used to analyze the multimedia content 301 for certain characteristics to determine one or more parameters, as described above. Analyzer 303 and converter 302 may be included into one block, or may be in two separate blocks. Analyzer 303 determines one or more parameters that contain the information about the overall structure of the multimedia content. A tag 304 is generated that encapsulates the one or more parameters. In one embodiment the tag that encapsulates the one or more parameters is a string of characters, e.g., one or more words. As shown in FIG. 3, tag 304 is inserted into plain text 305 in block 306. Text 305 and tag 304 are represented by tokens 307. Tokens 307 are fed into an LSM filter 309, as shown in FIG. 3. Tokens 307 are mapped as entries (vectors) in vector space 310. Tokens that include words and tags are elements of information that are mapped to vector space 310 of LSM filter 309. In one embodiment, each document of the multimedia content is a holder of tokens and each token is essential to hold documents in which it appears, appropriately weighted by the frequency of appearance. That is, documents, words, and tags represented by tokens can be mapped into vector space 310. In one embodiment, each word has an entry in vector space 310 and each document has an entry into vector space 310. In one embodiment, tokens represent a multimedia content, e.g., a document, a word in a document, a tag, or any combination thereof.

Optionally, certain words, for example, stop words, are removed in block 308 from the text before feeding to LSM filter 309. The term "stop word" is typically referred to the top 100 most frequently used words in English, and other most frequently used words on the Internet, e.g., "click", "password", and the like. Another example of the stop words (reverse stop words) can be the words that are strongly associated with one particular category, for example, a non-legitimate category. For example word "sweet", "teen" can be strongly associated with the non-legitimate category, but could in fact, occur in the legitimate category. The content filter may mistakenly block the multimedia content having such reverse stop words that provides a false positive. The false positive may include a legitimate material, for example, a legitimate web page, that is wrongly classified as an objectionable material. Removing of the reverse stop words can decrease the amount of the false positives and improve the accuracy of the LSM filter when the amount of training data is limited. In one embodiment, block 308 is included into LSM filter 309. In one embodiment, block 308 is an LSM filter interface.

As shown in FIG. 3, LSM filter 309 includes a vector space 310. Vector space 310 describes the relationship (e.g., the distance) between multimedia contents, e.g., documents, in that space. Tokens 307 that represent the multimedia content 301 (e.g., a web page) are mapped as vectors into vector space 310. That is, tokens 307 are mapped into vector space 310 of LSM filter 309, as described in further detail below.

In one embodiment, the multimedia content is classified based on the mapping into vector space 310, and then the multimedia content is filtered based on the classification, as described in further detail below. In one embodiment, LSM filter 309 is trained to recognize the multimedia content based on the one or more parameters. Training of the filter 309 can be performed by analyzing legitimate and non-legitimate ("explicit") contents, extracting tokens from these contents, and mapping the tokens into a vector space of the LSM filter 309, as described above.

Figure 4:
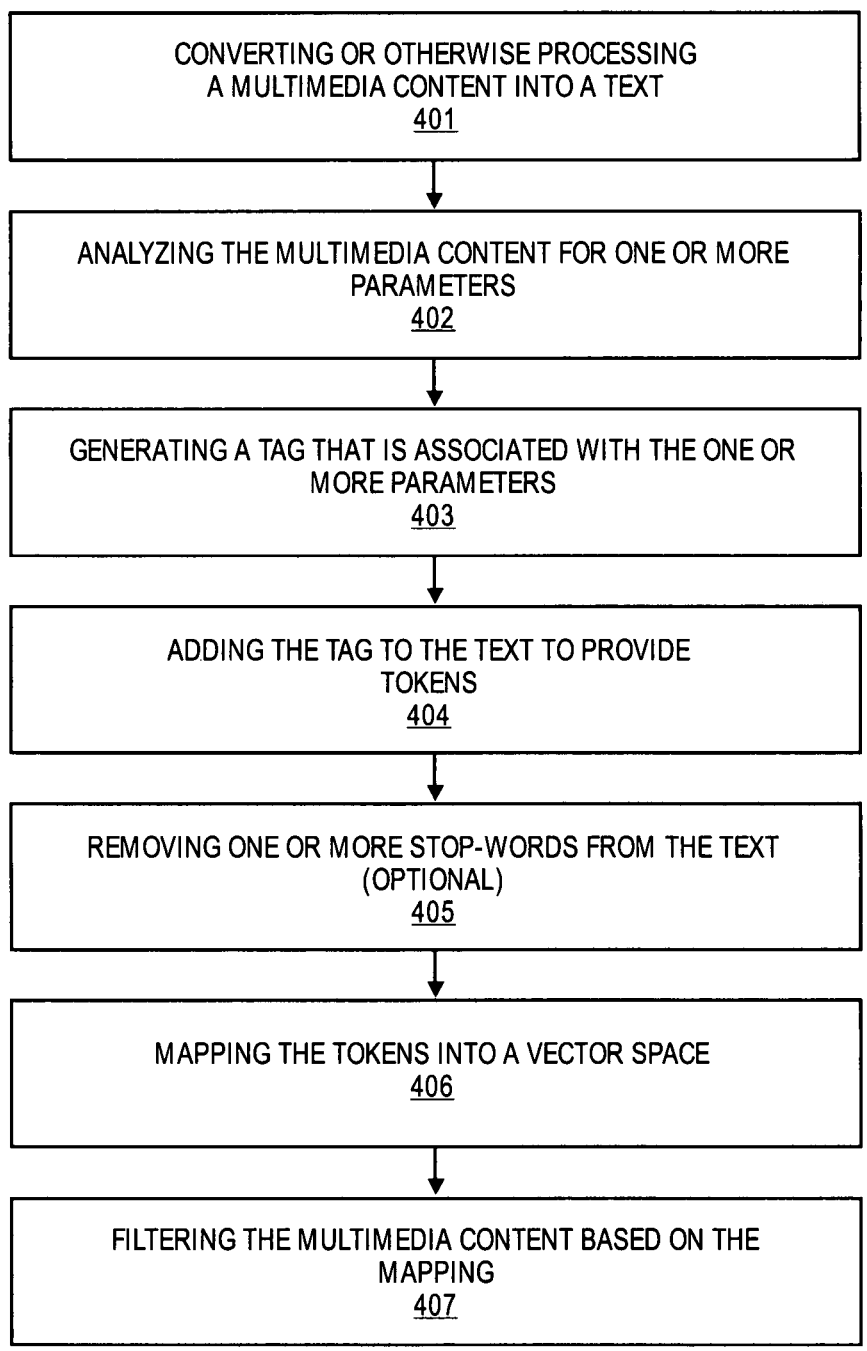
FIG. 4 shows a flowchart of one embodiment of a method to perform multimedia filtering based on one or more parameters using an LSM filter.

FIG. 4 shows a flowchart of one embodiment of a method to perform multimedia filtering based on one or more parameters using an LSM filter. Method 400 begins with operation 401 that involves converting or otherwise processing a multimedia content into a text, as described above.

Analyzing the multimedia content for one or more parameters is performed in operation 402, as described above. In one embodiment, operation 402 is performed during operation 401. In another embodiment, operation 402 follows operation 401. In yet another embodiment, operation 402 precedes operation 401. Next, at operation 403, a tag is generated that encapsulates the one or more parameters, as described above. Further, at operation 404, the tag is added into the text to provide tokens for an LSM filter. Optionally, operation 405 is performed that involves removing one or more stop words from the text before feeding the text to the LSM filter. Next, method 400 continues with operation 406 that involves mapping the tokens into a vector space of the LSM filter. Next, method 400 continues with operation 407 of filtering of the multimedia content based on the mapping. In one embodiment, the multimedia content is classified using the mapping, and then the multimedia content is filtered based on the classification, as described in further detail below.

Figure 5:
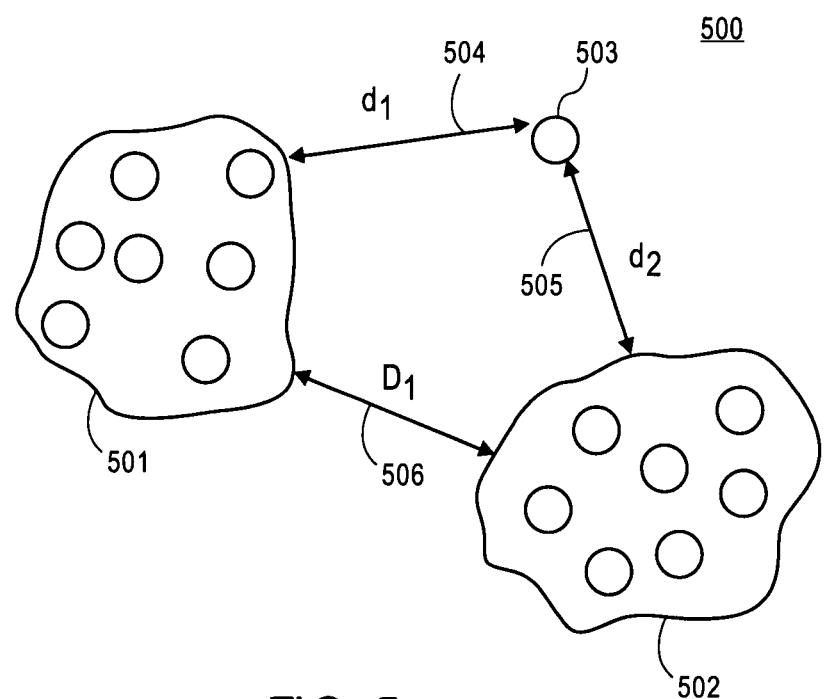
FIG. 5 illustrates one embodiment of a method to classify a new multimedia content based on mapping into a vector space of an LSM filter.

FIG. 5 illustrates one embodiment of a method to classify a new multimedia content based on mapping into a vector space of an LSM filter. As shown in FIG. 5, a vector space 500 includes a cluster 501 and a cluster 502. In one embodiment, cluster 501 includes a plurality of vectors representing legitimate multimedia contents, and cluster 502 includes a plurality of vectors representing non-legitimate ("explicit") multimedia contents. For example, the legitimate multimedia contents may include sex education content. The explicit content may be, for example, adult web sites, hate/violence, gambling web sites, and the like. As shown in FIG. 5, cluster 502 is positioned in vector space 500 at a distance 506 ("D1") from cluster 501. As described above, tokens that are extracted from a new content are mapped as vectors into vector space 500. As shown in FIG. 5, an entity 503 represents vectors of the new content in vector space 500. In one embodiment, the distance between entity 503 and each of entities 501 and 502 is measured. As shown in FIG. 5, entity 503 is located at a distance 504 ("d1") from cluster 501 and at a distance 505 ("d2") from cluster 502. In one embodiment, distance d1 is compared to distance d2 to classify the new content. If distance d1 is greater than distance d2, the new content is classified as a content that belongs to an explicit content category. If distance d1 is shorter than distance d2, the new content is classified as a content that belongs to a legitimate content category.

Figure 6:
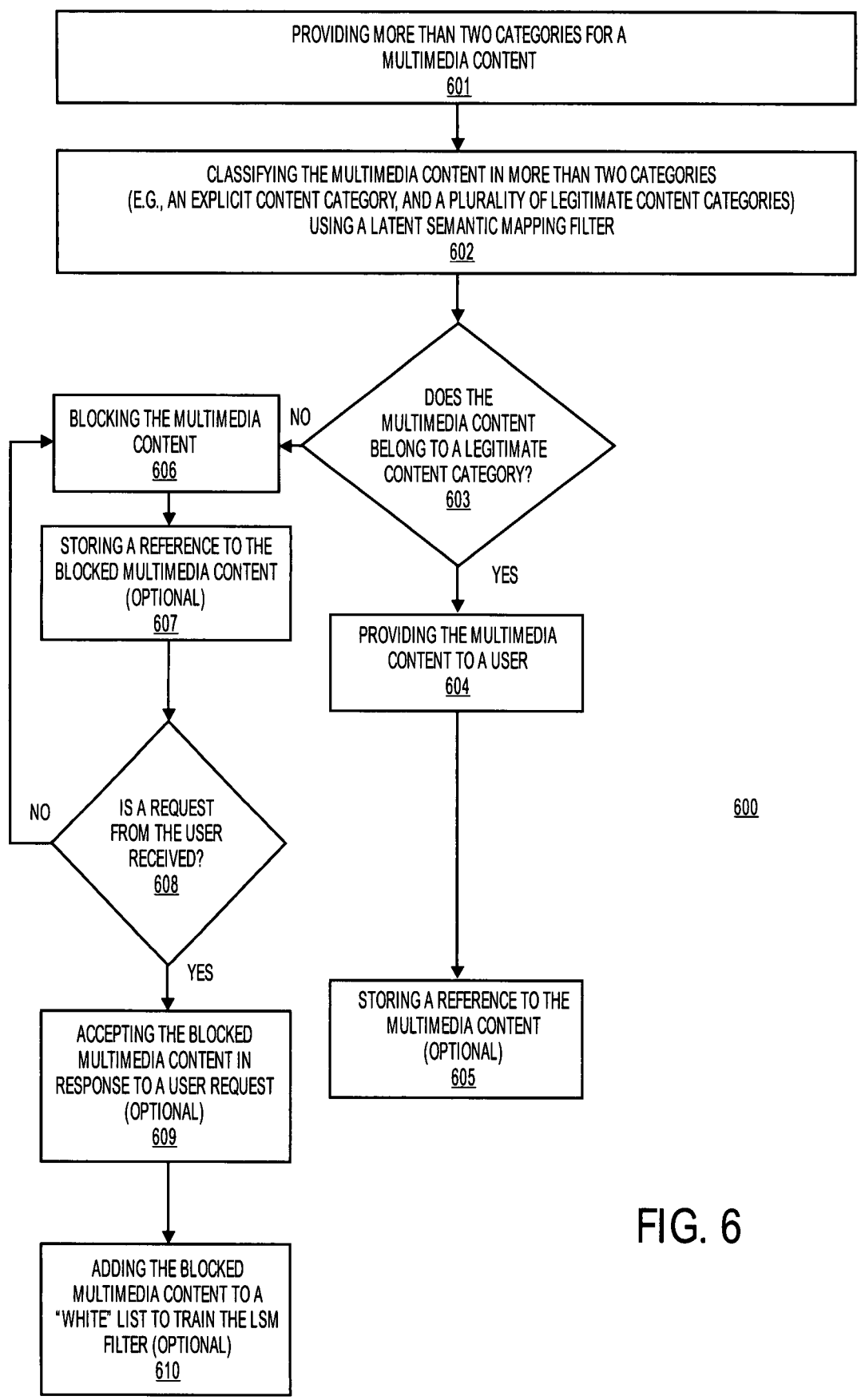
FIG. 6 shows a flowchart of one embodiment of a method of classify a multimedia content into more than two content categories using an LSM filter.

FIG. 6 shows a flowchart of one embodiment of a method of classify a multimedia content into more than two content categories using an LSM filter. Method 600 begins with operation 601 of providing more than two categories to describe a multimedia content. For example, a first category may include the material related to house, food, animals, pets; a second category may include the material related to body parts, clothing, medical, health; a third category may include the material related life, relationships, love issues, recreational activities, ethnicity issues; a fourth category may include an explicit material (e.g., nudity, pornography, hate/violence, and the like); and a fifth category may include any other legitimate material that does not match the previous categories. Method 600 continues with operation 602 that involves classifying the multimedia content in more than two categories using a latent semantic filter. The more than two categories may include more than one category for legitimate multimedia content, and one category for explicit content. By training the LSM filter with more than two categories instead of just two categories (explicit vs. legitimate) the occurrence of false positives is significantly reduced, so that the accuracy of the content filter is greatly improved.

Figure 7:
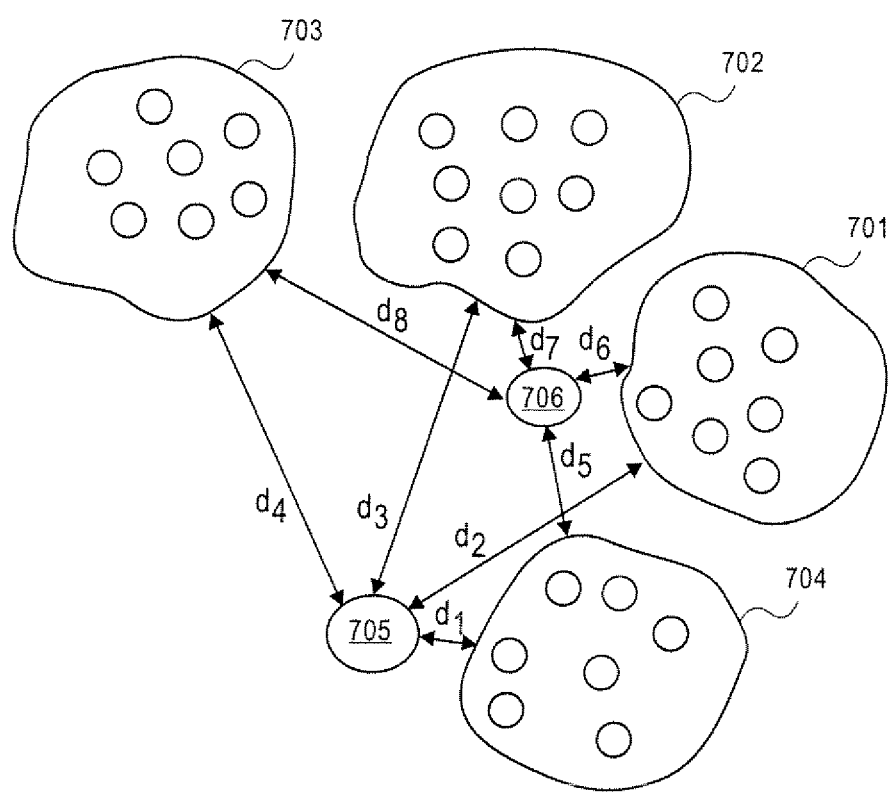
FIG. 7 illustrates one embodiment of a method to classify a new multimedia content in more than two categories based on mapping into a vector space of an LSM filter.

FIG. 7 illustrates one embodiment of a method to classify a new multimedia content in more than two categories based on mapping into a vector space of an LSM filter. As shown in FIG. 7, a vector space 700 includes a plurality 701 of vectors representing multimedia contents of a first legitimate category, a plurality 702 of vectors representing multimedia contents of a second legitimate category; a plurality 703 of vectors representing multimedia contents of a third legitimate category; and a plurality 704 of vectors representing multimedia contents of an explicit category. The explicit content may be, for example, adult web sites, hate/violence, gambling web sites, and the like. The tokens that are extracted from a first new content and a second new content, as described above, are mapped as vectors into vector space 700.

As shown in FIG. 7, vector 705 that represents a first new content and vector 706 that represents a second new content are mapped into vector space 700. As shown in FIG. 7, the distances d1-d4 between the vector 705 and each of the pluralities 701-704 are determined. As shown in FIG. 7, the distance d1 is the shortest out of distances d1-d4. The new content having vector 705 is classified to be in the explicit content category based on the shortest distance d1. As shown in FIG. 7, the distances d5-d8 between vector 706 and each of the pluralities 701-704 are determined. As shown in FIG. 7, the distance d6 is the shortest out of distances d5-d8. The new content having vector 706 is classified to be in the first legitimate content category based on the shortest distance d6. Using more than two categories to classify the multimedia content trains the LSM filter to recognize the multimedia content that it wasn't able to recognize using only two categories (e.g., a legitimate category and an explicit category). That is, use of more than categories helps to define boundaries of the category in vector space 700 with substantially higher accuracy than just using a single legitimate category and a single explicit category. In one embodiment, using multiple legitimate categories to classify the multimedia content trains the LSM filter to recognize the legitimate multimedia content that it wasn't able to recognize as a legitimate with a single legitimate category. That is, use of multiple legitimate categories helps to define boundaries of the explicit category in vector space 700 with substantially higher accuracy than just using a single legitimate category. In another embodiment, an explicit multimedia content is classified in a plurality of categories, for example, porn, gambling, violence, and the like, to increase accuracy of defining of the content in vector space 700. In yet another embodiment, a legitimate multimedia content is classified in a plurality of categories, and an explicit multimedia content is classified in a plurality of categories, to increase accuracy of defining the content in vector space 700.

Figure 8:
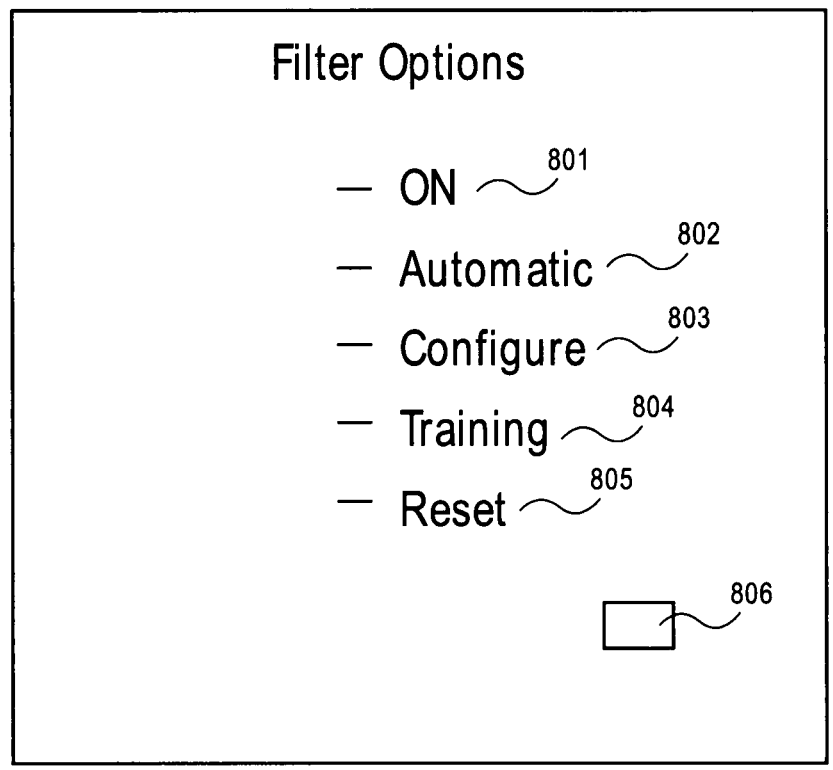
FIG. 8 illustrates one embodiment of a user interface for content filter options.

FIG. 8 illustrates one embodiment of a user interface 800 for content filter options. Interface 800 includes "on" 801, automatic 802, configure 803, training 804, and reset 805, all of which may be items that the user may optionally select. The content filter options provides the menu item "ON" 801 to allow the user to request that the content filter be turned on to try to block an undesired content.

The interface 800 has the menu item automatic 802 to allow the user to request that the content filter is put into automatic mode. While in automatic mode, the content filter automatically classifies the multimedia content, and takes appropriate actions based on the classifying, as described above.

The user interface 800 has the menu item training 804 to allow the user to request that the content filter to be put into a training mode. While in training mode, the content filter is trained to recognize the kind of multimedia content that the user considers to filter out, as described above.

The user interface 800 has the menu item reset 805 to allow the user to request that the training of the content filter is reset to initial factory settings. The reset 805 causes the content filter to undo all of the previous training. In one embodiment, the training data may be deleted. In another embodiment, the training data may be kept but ignored.

The content filter user interface 800 has the menu item configure 803 to allow the user to specify the content (e.g., web sites) that the user wants to accept and sites that the user wants to block.

Figure 9:
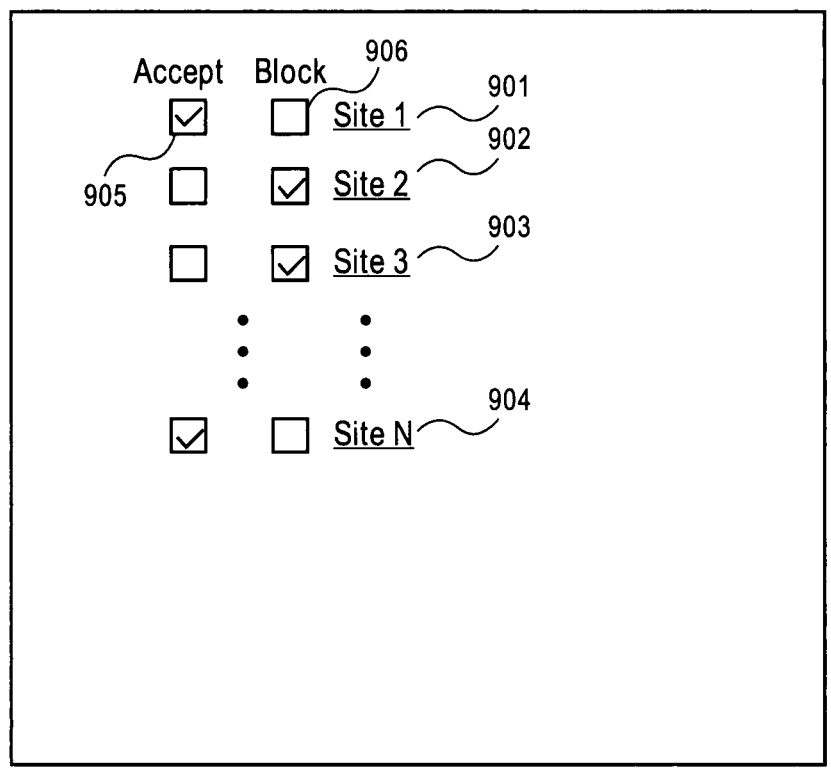
FIG. 9 illustrates a user interface to configure a content filter.

FIG. 9 illustrates a user interface 900 that displays when the menu item configure 803 depicted in FIG. 8 is checked. User interface 900 has a list of references (links, names, and the like) to multimedia contents (e.g., web sites) 901, 902, 903, 904. As shown in FIG. 9, two check boxes 905 and 906 are displayed next to each of the references 901-904. Check box 905 is checked when the user wants the content to be accepted by the content filter. Check box 906 is checked when the user wants the content to be blocked by the content filter, as shown in FIG. 9.

Referring back to FIG. 8, interface 800 has button 806 to access to a blocked multimedia content. In one embodiment, a list of references (e.g., links, names) to multimedia contents that have been visiting most frequently and the list of references to the multimedia contents that have been blocked are stored in a memory. In one embodiment, if the list of most frequently accessed multimedia contents contains an undesirable content, the undesirable content may be automatically added to a "black list". In one embodiment, the multimedia content added to the "black list" is provided to train the content filter.

In one embodiment, if a user tries to access the multimedia content, e.g., a web site, that is blocked, then the user presses button 806. A message asking for a password can be displayed in response to pressing button 806.

Figure 10:
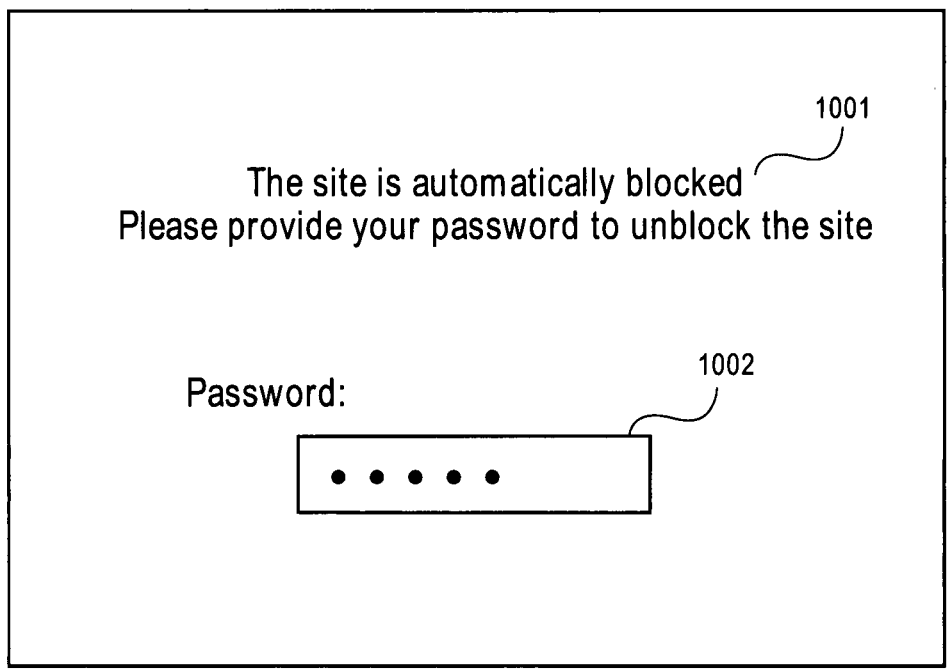
FIG. 10 illustrates one embodiment of a user interface that requires a password from a user to access a multimedia content that has been blocked by a content filter.

FIG. 10 illustrates one embodiment of a user interface that requires a password from a user to access a multimedia content that has been blocked by a content filter. As shown in FIG. 10, the user interface includes a message 1001 "The site is automatically blocked. Please provide your password to unblock the site." Password box 1002 is displayed, so the user can type in the password to unblock the blocked content. In one embodiment, the blocked multimedia content is automatically added to a list of acceptable contents ("white list") in response to providing the password. In one embodiment, reference to the added content is displayed on user interface 900. In one embodiment, the unblocked multimedia content is provided to train the content filter, as described below.

Referring back to FIG. 6, at operation 603, a determination is made whether the multimedia content belong to a legitimate content category. If the multimedia content belongs to a legitimate content category, the multimedia content is provided to a user at operation 604. Optionally, a reference, e.g., a link, to the multimedia content provided to the user may be stored in a memory at operation 605. In one embodiment, a tag to this multimedia content is stored in a memory. In one embodiment, the multimedia content provided to the user in operation 603 may be added to a legitimate content list ("white list"), be used to train the LSM filter, or both. In another embodiment, the multimedia content initially provided to the user in operation 603 in response to a user request may be added to an explicit content list ("black list"), be used to train the LSM filter, or both.

If the multimedia content belongs to an explicit category, the multimedia content is blocked at operation 606. Optionally, a reference, e.g., a link, to the blocked multimedia content is stored in a memory at operation 607. In one embodiment, the tag to the multimedia content is stored a memory. In one embodiment, the multimedia content blocked in operation 606 may be added to the "black list", be used to train the LSM filter, or both. Next, at operation 608, a determination is made whether a request from a user is received to accept the blocked content. If the request is received, an optional operation 609 can be performed that involves accepting the blocked multimedia content in response to the user's request. The previously blocked multimedia content can be provided to the user at operation 604 in response to the user request. Next, an optional operation 610 can be performed that involves adding the initially blocked at operation 606 multimedia content to a legitimate content list "white list" in response to the user request. In one embodiment, the initially blocked in operation 606 multimedia content in response to the user request may be added to the "white list", be used to train the LSM filter, or both.

Figure 11:
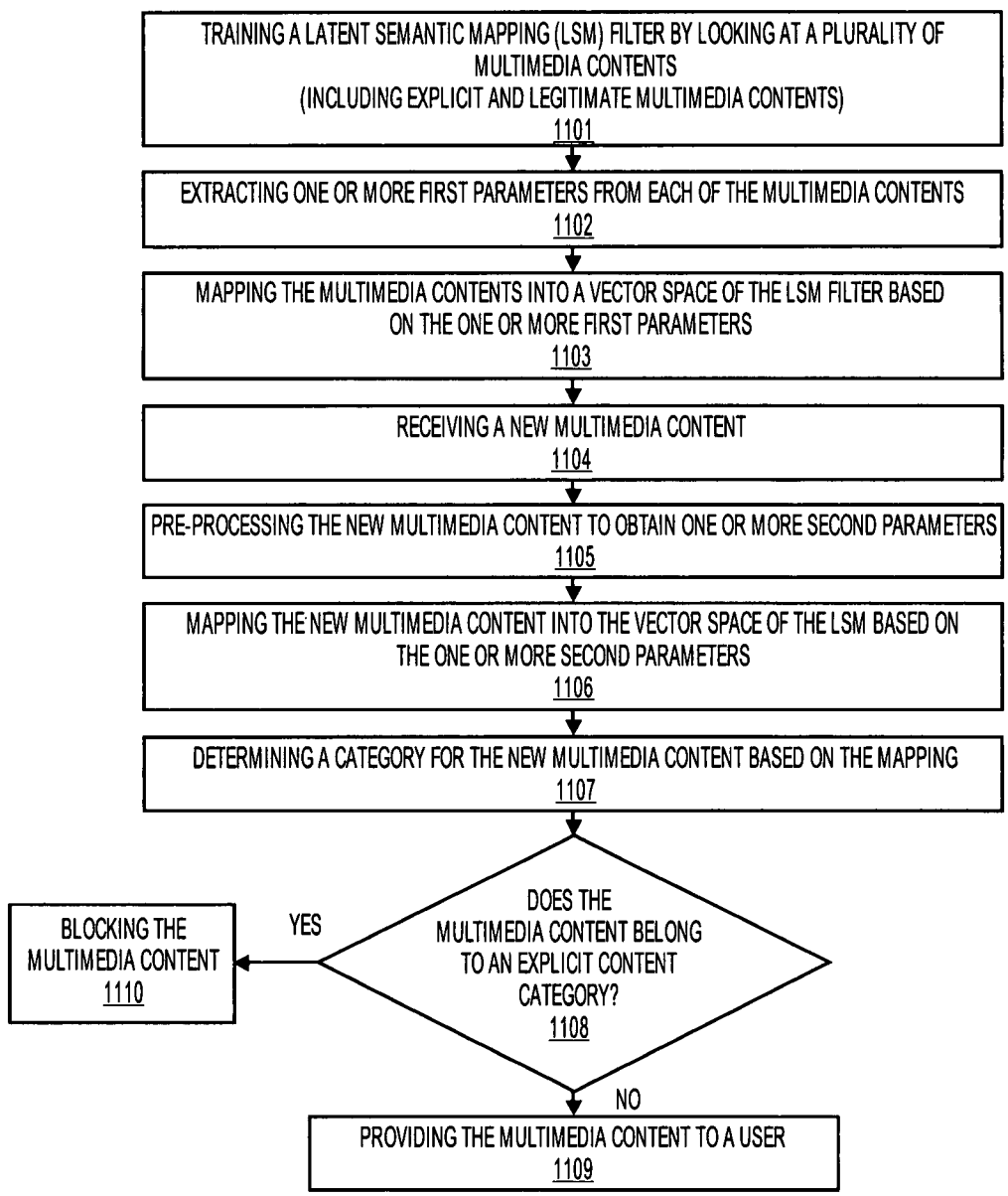
FIG. 11 shows a flowchart of another embodiment of a method of classifying a multimedia content using an LSM filter.

FIG. 11 shows a flowchart of another embodiment of a method of classifying a multimedia content using an LSM filter. Method 1100 begins with operation 1101 that involves training a latent semantic filter by looking at a plurality of multimedia contents (including explicit and legitimate multimedia contents), as described above. Next, method continues with operation 1102 that involves extracting one or more first parameters from each of the multimedia contents, as described above. The multimedia contents are mapped into a vector space of an LSM filter based on the one or more first parameters at operation 1103, as described above. Next, operation 1104 is performed that involves receiving a new multimedia content. In operation 1105, the new multimedia content is pre-processed to obtain one or more second parameters. Next, operation 1106 that involves mapping the new multimedia content into a vector space of LSM filter is performed based on one or more second parameters. Method continues with operation 1107 is performed that involves determining a category of the new multimedia content based on the mapping. Further, a determination is made whether the new multimedia content belongs to an explicit content category at operation 1108. If the new multimedia content does not belong to the explicit content category, the multimedia content is provided to a user in operation 1109. If the new multimedia content is determined to belong to the explicit category, the new multimedia content is blocked in operation 1110.

In the foregoing specification, embodiments of the invention have been described with reference to specific exemplary embodiments thereof. It will be evident that various modifications may be made thereto without departing from the broader spirit and scope of the invention. The specification and drawings are, accordingly, to be regarded in an illustrative sense rather than a restrictive sense.

What is claimed is:

1. A method, comprising:
   analyzing, by one or more processing devices, a web page content for predetermined parameters, wherein at least one of the predetermined parameters is based on an image media content;
   generating a tag that encapsulates the at least one predetermined parameter;

processing the web page content to provide text representing the web page Content;
inserting the tag into the text to provide tokens;
inputting the tokens into a latent semantic mapping (LSM) filter;
mapping the tokens into a vector space of the latent semantic mapping filter:
analyzing, by the one or more processing devices, the web page content using the latent semantic mapping filter wherein the vector space of the latent semantic mapping filter includes a first plurality of vectors at a first location and a second plurality of vectors at a second location, wherein the first location comprises materials related to predefined legitimate multimedia content, the second location comprises materials related to predefined explicit multimedia content, and at least one input into the latent semantic mapping filter comprises one or more representations of the web page content that are mapped to a third location in the vector space;
determining, by the one or more processing devices, distances between
the third location and the first location, and
the third location and the second location; and
filtering, by the one or more processing devices, the web page content based on the determined distances.

2. The method of claim 1, wherein the predetermined parameters include information about a structure of the web page content.

3. The method of claim 1, wherein the predetermined parameters include information relating to a number of references.

4. The method of claim 1, wherein the predetermined parameters include information relating to a number of images.

5. The method of claim 1, wherein the predetermined parameters include information relating to a length of the web page content.

6. The method of claim 1, wherein the predetermined parameters includes a textual pattern.

7. The method of claim 1, further comprising rating the web page content based on the predetermined parameters.

8. The method of claim 1, wherein the web page content includes an executable script from which text is extracted in processing the web page content.

9. The method of claim 1, further comprising
training the LSM filter to recognize the web page content based on the predetermined parameters.

10. A method, comprising:
analyzing a multimedia content for one or more parameters;
generating one or more tags associated with the one or more parameters;
providing the one or more tags to a latent semantic (LSM) filter;
providing, by one or more processing devices, a vector space having at least two categories for the multimedia content, the vector space comprising a first plurality of vectors at a first location, and a second plurality of vectors at a second location, wherein the first location comprises materials related to predefined legitimate multimedia content, the second location comprises materials related to predefined explicit multimedia content, and wherein one or more representations of a new multimedia content are mapped to a third location in the vector space;
determining by the one or more processing devices distances between the third location and the first location, and the third location and the second location; and
classifying, by the one or more processing devices, a new multimedia content based on the distances determined.

11. The method of claim 10, wherein the at least two categories is any combination of an explicit content category and a first plurality of legitimate content categories, a legitimate content category and a second plurality of explicit content categories, or a third plurality of explicit content categories and a fourth plurality of legitimate content categories.

12. The method of claim 10, further comprising
blocking the multimedia content based on the classifying.

13. The method of claim 10, further comprising
storing a reference to the multimedia content.

14. The method of claim 10, further comprising
accepting the multimedia content; and
adding the accepted multimedia content to a list to train the latent semantic filter.

15. A method to classify a multimedia content, comprising:
processing, by one or more processing devices, the multimedia content to
provide text for an analysis of the multimedia content;
analyzing, by the one or more processing devices, the multimedia content for predetermined parameters, wherein at least one of the predetermined parameters is based on image media content;
generating, by the one or more processing devices, a tag that encapsulates at least one of the predetermined parameters;
associating, by the one or more processing devices, the tag with the text to provide one or more tokens; and
mapping, by the one or more processing devices, the one or more tokens into a vector space containing a first plurality of vectors at a first location, and a second plurality of vectors at a second location, wherein the first location comprises materials related to predefined legitimate multimedia content, the second location comprises materials related to predefined explicit multimedia content, and wherein the one or more tokens are mapped into a third location in the vector space;
determining by the one or more processing devices distances between the third location and the first location, and the third location and the second location; and
determining, by the one or more processing devices, whether to filter the multimedia content based on the distances.

16. The method of claim 15, wherein the tag includes a string of characters.

17. The method of claim 15, wherein the processing includes
extracting strings within an executable script.

18. The method of claim 15, further including
removing one or more stop words from the text.

19. The method of claim 15, further comprising
filtering the multimedia content based on the mapping.

20. An article of manufacture comprising:
a non-transitory machine-accessible storage medium storing data that, when accessed by a machine, cause the machine to perform operations comprising:
analyzing a web page content for predetermined parameters, wherein at least one of the predetermined parameters is based on an image media content;
generating a tag that encapsulates the at least one predetermined parameter;
processing the web page content to provide text representing the web page content;

inserting the tag into the text to provide tokens;
inputting the tokens into a latent semantic mapping (LSM) filter;
mapping the tokens into a vector space of the latent semantic mapping filter;
analyzing the web page content using a latent semantic mapping filter, wherein the latent semantic mapping filter comprises a vector space containing a first plurality of vectors at a first location, and a second plurality of vectors at a second location, wherein the first location comprises materials related to predefined legitimate multimedia content, the second location comprises materials related to predefined explicit multimedia content, and
wherein at least one input into the latent semantic mapping filter comprises one or more representations of the web page content that are mapped to a third location in a vector space;
determining distances between the third location and the first location, and the third location and the second location; and
determining whether to filter the web page content based on the distances.

21. The article of manufacture of claim 20, wherein the predetermined parameters include information about a structure of the web page content.

22. The article of manufacture of claim 20, wherein the predetermined parameters include information relating to a number of references.

23. The article of manufacture of claim 20, wherein the predetermined parameters include information relating to a number of images.

24. The article of manufacture of claim 20, wherein the predetermined parameters include information relating to a length of the web page content.

25. The article of manufacture of claim 20, wherein the predetermined parameters includes a textual pattern.

26. The article of manufacture of claim 20, wherein the machine-accessible medium further includes data that cause the machine to perform operations comprising,
rating the web page content based on the predetermined parameters.

27. The article of manufacture of claim 20, wherein the web page content includes an executable script from which text is extracted in processing the web page content.

28. The article of manufacture of claim 20, wherein the machine-accessible medium further includes data that cause the machine to perform operations comprising,
training the LSM filter to recognize the web page content based on the predetermined parameters.

29. An article of manufacture comprising:
a non-transitory machine-accessible storage medium storing data that, when accessed by a machine, cause the machine to perform operations comprising:
analyzing a multimedia content for one or more parameters;
generating one or more tags associated with the one or more parameters;
providing the one or more tags to a latent semantic (LSM) filter;
providing a vector space having at least two categories for the multimedia content, the vector space comprising a first plurality of vectors at a first location, and a second plurality of vectors at a second location, wherein the first location comprises materials related to predefined legitimate multimedia content, the second location comprises materials related to predefined explicit multimedia content, and wherein one or more representations of a new multimedia content are mapped to a third location in the vector space;
determining distances between the third location and the first location, and the third location and the second location; and
classifying a new multimedia content based on the distances determined.

30. The article of manufacture of claim 29, wherein the at least two categories is any combination of an explicit content category and a first plurality of legitimate content categories, a legitimate content category and a second plurality of explicit content categories, or a third plurality of explicit content categories and a fourth plurality of legitimate content categories.

31. The article of manufacture of claim 29, wherein the machine-accessible medium further includes data that cause the machine to perform operations comprising,
blocking the multimedia content based on the classifying.

32. The article of manufacture of claim 29, further comprising
storing a reference to the multimedia content.

33. The article of manufacture of claim 29, wherein the machine-accessible medium further includes data that cause the machine to perform operations comprising,
accepting the multimedia content; and
adding the accepted multimedia content to a list to train the latent semantic filter.

34. An article of manufacture comprising:
a non-transitory machine-accessible storage medium storing data that, when accessed by a machine, cause the machine to perform operations to classify a multimedia content, comprising:
processing the multimedia content to provide text for an analysis of the multimedia content;
analyzing the multimedia content for predetermined parameters, wherein at least one parameter is based on image media content;
generating a tag that encapsulates at least one of the predetermined parameters;
associating the tag with the text to provide one or more tokens; and
mapping the one or more tokens into a vector space containing a first plurality of vectors at a first location, and a second plurality of vectors at a second location, wherein the first location comprises materials related to predefined legitimate multimedia content, the second location comprises materials related to predefined explicit multimedia content, and wherein the one or more tokens are mapped into a third location in the vector space;
determining distances between the third location and the first location, and the third location and the second location; and
determining whether to filter the multimedia content based on the distances.

35. The article of manufacture of claim 34, wherein the tag includes a string of characters.

36. The article of manufacture of claim 34, wherein the processing includes extracting strings within an executable script.

37. The article of manufacture of claim 34, wherein the machine-accessible medium further includes data that cause the machine to perform operations comprising,
removing one or more stop words from the text.

38. The article of manufacture of claim 34, wherein the machine-accessible medium further includes data that cause the machine to perform operations comprising,
   filtering the multimedia content based on the mapping.

39. A computer system, comprising:
   a bus;
   a data storage device coupled to the bus;
   one or more processing devices coupled to the data storage device, wherein the data storage device stores instructions executed by the one or more processing devices to perform operations, comprising:
   analyzing a web page content for predetermined parameters, wherein at least one parameter is based on an image media content;
   generating a tag that encapsulates the at least one parameter;
   processing the web page content to provide text for an analysis of the web page content;
   inserting the tag into the text to provide tokens;
   mapping the tokens into a vector space of a latent semantic mapping filter;
   analyzing the web page content using the latent semantic mapping filter, wherein the latent semantic mapping filter comprises a vector space containing a first plurality of vectors at a first location, and a second plurality of vectors at a second location, wherein the first location comprises materials related to predefined legitimate multimedia content, the second location comprises materials related to predefined explicit multimedia content, and wherein at least one input into the latent semantic mapping filter comprises one or more representations of the image media content that are mapped to a third location in the vector space;
   determining distances between the third location and the first location, and the third location and the second location; and
   determining whether to filter the web page content based the distances.

40. The system of claim 39, wherein the web page content includes an executable script from which text is extracted in processing the web page content.

41. The system of claim 39, wherein the one or more processing devices further performing operations, comprising:
   training the LSM filter to recognize the web page content based on the predetermined parameters.

42. A computer system, comprising:
   a bus;
   a data storage device coupled to the bus;
   one or more processing devices coupled to the storage device, wherein the storage device stores instructions executed by the one or more processing devices to perform operations, comprising;
   analyzing a multimedia content for one or more parameters;
   generating one or more tags associated with the one or more parameters;
   providing the one or more tags to a latent semantic (LSM) filter;
   providing a vector space having at least two categories for the multimedia content, the vector space comprising a first plurality of vectors at a first location, and a second plurality of vectors at a second location, wherein the first location comprises materials related to predefined legitimate multimedia content, the second location comprises materials related to predefined explicit multimedia content, and wherein one or more representations of a new multimedia content are mapped to a third location in the vector space;
   determining distances between the third location and the first location, and the third location and the second location; and
   classifying a new multimedia content based on distances determined.

43. The system of claim 42, wherein the at least two categories is any combination of an explicit content category and a first plurality of legitimate content categories, a legitimate content category and a second plurality of explicit content categories, or a third plurality of explicit content categories and a fourth plurality of legitimate content categories.

44. The system of claim 43, wherein the one or more processing devices further performing operations, comprising:
   blocking the multimedia content based on the classifying.

45. A computer system to classify a multimedia content, comprising:
   a bus;
   a data storage device coupled to the bus;
   one or more processing devices coupled to the data storage device, wherein the data storage device stores instructions executed by the one or more processing devices to perform operations, comprising:
   processing the multimedia content to provide text for analysis of the multimedia content;
   analyzing the multimedia content for predetermined parameters, wherein at least one of the predetermined parameters is based on image media content;
   generating a tag that encapsulates the at least one of the predetermined parameters;
   associating the tag with the text to provide one or more tokens; and
   mapping the one or more tokens into a vector space containing a first plurality of vectors at a first location, and a second plurality of vectors at a second location, wherein the first location comprises materials related to predefined legitimate multimedia content, the second location comprises materials related to predefined explicit multimedia content, and wherein the one or more tokens are mapped into a third location in the vector space;
   determining distances between the third location and the first location, and the third location and the second location; and
   determining whether to filter the multimedia content based on the distances.

46. The system of claim 45, wherein the processing includes
   extracting strings within an executable script.

47. The system of claim 45, wherein the processing includes
   removing one or more stop words from the text.

48. A method, comprising:
   processing, by one or more processing devices, multimedia content to provide processed content for use by a latent semantic mapping filter;
   analyzing the multimedia content for predetermined parameters;
   generating a tag that encapsulates at least one of the predetermined parameters;
   processing the multimedia content to provide text representing the multimedia content;
   inserting the tag into the text to provide tokens;
   inputting the tokens into the latent semantic mapping filter;

mapping the tokens into a vector space of the latent semantic mapping filter;

classifying, by the one or more processing devices, the processed content with the latent semantic mapping filter including the vector space, the vector space having at least two categories for the multimedia content, the vector space comprising a first plurality of vectors at a first location, and a second plurality of vectors at a second location, wherein the first location comprises materials related to predefined legitimate multimedia content, the second location comprises materials related to predefined explicit multimedia content, and wherein one or more representations of the multimedia content are mapped to a third location in the vector space and wherein distances between the third location and the first location, and the third location and the second location; and determining, by the one or more processing devices, whether to filter the multimedia content based upon the classifying.

49. An article of manufacture, comprising:
a non-transitory machine-readable storage medium storing executable program instructions which when executed by a data processing system cause the system to perform operations comprising:
processing multimedia content to provide processed content for use by a latent semantic mapping filter; analyzing the multimedia content for predetermined parameters;
generating a tag that encapsulates at least one of the predetermined parameters;
processing the multimedia content to provide text representing the multimedia content;
inserting the tag into the text to provide tokens;
inputting the tokens into the latent semantic mapping filter;
mapping the tokens into a vector space of the latent semantic mapping filter;
classifying the processed content with the latent semantic mapping filter including the vector space, the vector space having at least two categories for the multimedia content, the vector space comprising a first plurality of vectors at a first location, and a second plurality of vectors at a second location, wherein the first location comprises materials related to predefined legitimate multimedia content, the second location comprises materials related to predefined explicit multimedia content, and wherein one or more representations of the multimedia content are mapped to a third location in the vector space and wherein distances between the third location and the first location, and the third location and the second location are determined; and
determining whether to filter the multimedia content based upon the classifying.

50. A method, comprising:
presenting a user interface on a display device;
receiving, by one or more processing devices, input from the user interface;
placing, by the one or more processing devices, a latent semantic mapping filter of a web page content to operate in a training mode to recognize which kind of multimedia content to filter out in response to the input from the user interface;
analyzing, by the one or more processing devices, the web page content for predetermined parameters;
generating a tag that encapsulates at least one predetermined parameter;
processing the web page content to provide text representing the web page content;
inserting the tag into the text to provide tokens;
inputting the tokens into the latent semantic mapping filter; and
mapping the tokens into a vector space of the latent semantic mapping filter;
wherein the latent semantic mapping filter includes a first plurality of vectors at a first location in a vector space, and a second plurality of vectors at a second location in the vector space, wherein the first location comprises materials related to predefined legitimate multimedia content, the second location comprises materials related to predefined explicit multimedia content, and wherein one or more representations of the web page content are mapped to a third location in the vector space, and wherein distances between the third location and the first location, and the third location and the second location are determined to recognize the multimedia content.

51. The method as in claim 50, wherein the presenting is in response to receiving data relating to a web page.

52. The method as in claim 51, wherein the training mode comprises modifying parameters of the latent semantic mapping filter.

53. An article of manufacture, comprising:
a non-transitory machine-readable storage medium storing executable program instructions which when executed by a data processing system cause the system to perform operations comprising:
presenting a user interface;
receiving input from the user interface; and
placing a latent semantic mapping filter of a web page content to operate in a training mode to recognize which kind of multimedia content to filter out in response to the input from the user interface;
analyzing the web page content for predetermined parameters;
generating a tag that encapsulates at least one predetermined parameter;
processing the web page content to provide text representing the web page content;
inserting the tag into the text to provide tokens;
inputting the tokens into the latent semantic mapping filter; and
mapping the tokens into a vector space of the latent semantic mapping filter;
wherein the latent semantic mapping filter includes a first plurality of vectors at a first location in a vector space, and a second plurality of vectors at a second location in the vector space, wherein the first location comprises materials related to predefined legitimate multimedia content, the second location comprises materials related to predefined explicit multimedia content, and wherein one or more representations of the web page content are mapped to a third location in the vector space, and wherein distances between the third location and the first location, and the third location and the second location are determined to recognize the multimedia content.

* * * * *

UNITED STATES PATENT AND TRADEMARK OFFICE
CERTIFICATE OF CORRECTION

| | |
|---|---|
| PATENT NO. | : 8,626,930 B2 |
| APPLICATION NO. | : 11/724880 |
| DATED | : January 7, 2014 |
| INVENTOR(S) | : Giovanni Donelli et al. |

It is certified that error appears in the above-identified patent and that said Letters Patent is hereby corrected as shown below:

In the Claims

Claim 1, Column 15, line 2, please change:

"page Content" to -- page content --

Signed and Sealed this
Nineteenth Day of August, 2014

Michelle K. Lee
*Deputy Director of the United States Patent and Trademark Office*